United States Patent [19]

Young et al.

[11] 4,047,740
[45] Sept. 13, 1977

[54] INTERNALLY INSULATED BELLOWS ASSEMBLY

[75] Inventors: D. Craig Young; Abraham L. Zadoks, both of Peoria, Ill.

[73] Assignee: Caterpillar Tractor Co., Peoria, Ill.

[21] Appl. No.: 691,747

[22] Filed: June 1, 1976

[51] Int. Cl.² .................. F16L 51/02; F16L 59/14
[52] U.S. Cl. ................................ 285/47; 285/226
[58] Field of Search ............. 285/226, 47, 53, 227, 285/228, 229, 300, 301, 299, 48

[56] References Cited

U.S. PATENT DOCUMENTS

| | | | |
|---|---|---|---|
| 1,821,274 | 9/1931 | Plummer | 285/226 X |
| 2,998,270 | 8/1961 | Watkins | 285/227 X |
| 3,058,759 | 10/1962 | McDuff | 285/226 X |
| 3,254,910 | 6/1966 | Poole et al. | 285/226 |
| 3,705,734 | 12/1972 | Rajakovics | 285/47 |
| 3,730,566 | 5/1973 | Kazmierski et al. | 285/229 |
| 3,891,396 | 6/1975 | Musall et al. | 285/300 X |
| 3,901,539 | 8/1975 | Ijzerman | 285/227 X |

FOREIGN PATENT DOCUMENTS

| | | | |
|---|---|---|---|
| 2,266,095 | 10/1975 | France | 285/227 |
| 2,203,437 | 8/1972 | Germany | 285/226 |
| 835,092 | 3/1952 | Germany | 285/226 |

Primary Examiner—Thomas F. Callaghan
Attorney, Agent, or Firm—James R. Bell

[57] ABSTRACT

An internally insulated bellows assembly for providing a flexible transition between internally and externally insulated components of a high temperature fluid pressure system comprises an annular bellows having first and second end portions, a cylindrical shield disposed in spaced, concentric relation within the bellows and co-extensive therealong to provide an annular cavity therebetween. The shield has first and second end portions with the first end portions being connected to the first end portion of the bellows and with the second end portion being disposed in spaced radial relationship inwardly from the second end portion of the bellows to provide a predetermined radial gap therebetween. Loose fill insulation material is disposed within the cavity to a point adjacent the second end portion of the shield in filling relation within the internal convolutions of the bellows. An annular ring of constrained insulation sized for close fitting receipt within the cavity is provided for closing the gap between the end portions of the shield and the bellows.

4 Claims, 1 Drawing Figure

U.S. Patent  Sept. 13, 1977  4,047,740
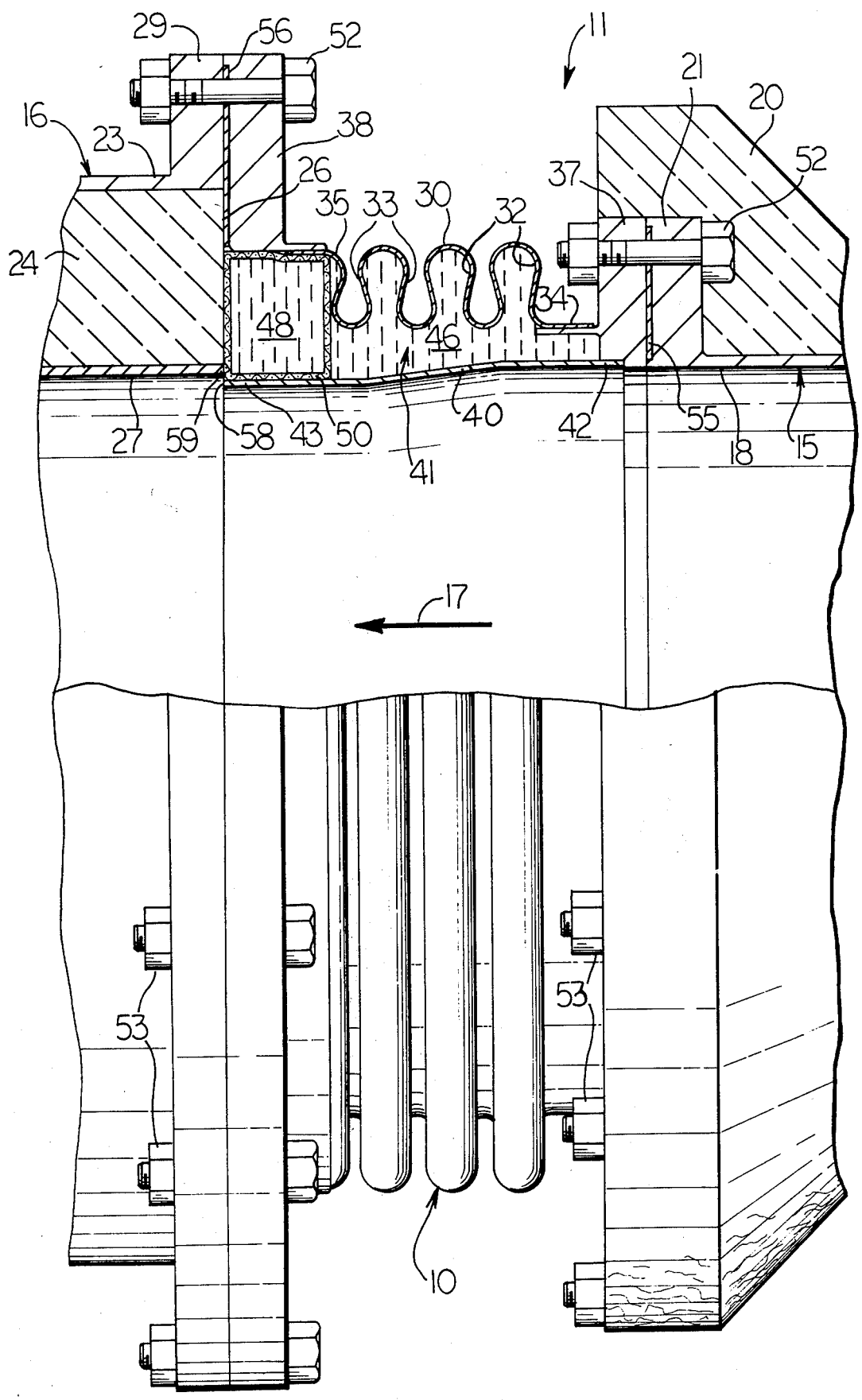

INTERNALLY INSULATED BELLOWS ASSEMBLY

BACKGROUND OF THE INVENTION

This invention relates to an internally insulated bellows assembly for conducting pressurized fluid between two components of a high temperature fluid pressure system, such as a gas turbine engine or the like.

It has been found that by internally insulating the case of a gas turbine engine, the cost of such engine can be significantly reduced because the case can be constructed from inexpensive carbon steel, rather than high temperature nickel based alloyed steel, such as necessary for the internal components of the engine.

A recuperator, on the other hand, functions best when it is externally insulated. Consequently, a problem exists in connecting the internally insulated case of the gas turbine engine to the externally insulated recuperator case due to the vast temperature differential therebetween which can cause undue thermal loading due to the thermal distortion between the cases.

SUMMARY AND OBJECTS OF THE INVENTION

Accordingly, an object of this invention is to provide an internally insulated bellows assembly for conducting fluid between two components at different temperatures which permits relative movement between the components and serves as a thermal gradient therebetween to prevent the transfer of heat from one component to the other.

Other objects and advantages of the present invention will become more readily apparent upon referrences to the accompanying drawing and following description.

BRIEF DESCRIPTION OF THE DRAWING

The drawing is an axial cross sectional view of an internally insulated bellows assembly embodying the principles of the present invention for connecting two components of a high temperature fluid pressure system.

DETAILED DESCRIPTION OF THE PREFERRED EMBODIMENT

Referring more particularly to the drawing, an internally insulated bellows assembly embodying the principles of the present invention is generally indicated at 10 in associated with a high temperature fluid pressure system 11 which includes a first pipe 15 and a second, axially spaced pipe 16 for conducting a flow of fluid along a predetermined flow path, indicated by an arrow 17.

The first pipe 15 has an outlet end 18 and is externally insulated by any suitably insulation material 20, such as alumina silica ceramic fiber insulation, which is wrapped or otherwise suitably secured about the pipe. The first pipe also has a radially outwardly extending mounting flange 21 connected adjacent the outlet end 18 thereof.

The second pipe 16 has an inlet 23 and is internally insulated with a suitable insulation material 24, such as alumina silica ceramic fiber insulation, disposed within the pipe and having an end 26 generally disposed in alignment with the inlet end 23 of the pipe. An inner tubular shield 27 of a suitable material, such as stainless steel, is mounted in a suitable manner, not shown, internally of the insulation material 24 to protect such insulation from being eroded or otherwise damaged by the air flow along flow path 17. The second pipe 16 also includes a radially outwardly extending mounting flange 29 connected adjacent the inlet end 23 thereof.

It will be appreciated that if the fluid flowing through the pipes 15 and 16 along the flow path 17 is at a substantially elevated temperature above ambient, the first pipe 15 will be relatively hot because of being directly exposed to the high temperature fluid, while the second pipe 16 will be relatively cooler because of being insulated from the fluid. This may result in relative movement between the pipes due to their vastly different degrees of thermal expansions, causing thermal loading to occur.

In accordance with the present invention, the internally insulated bellows assembly 10 includes a flexible annular bellows 30 preferably of a metal construction, such as stainless steel, and having a plurality of alternating internally and externally opening convolutions 32 and 33, respectively, and first and second end portions 34 and 35, respectively. The bellows assembly also includes first and second mounting flanges 37 and 38 connected in any suitable manner, such as by seam welding, to the first and second end portions 34 and 35, respectively of the bellows.

A cylindrical shield 40 of a size smaller than the bellows is disposed in spaced concentric relation within and coextensive relation along such bellows, defining a predetermined annular cavity 41 therebetween. The shield 40 is preferably constructed from a high temperature resistant metal, such as stainless steel, and has first and second end portions 42 and 43, with the first end portion 42 being connected, preferably by welding, to the first mounting flange 37 of the bellows assembly which closes one end of the cavity. The second end portion 43 is disposed in radially inwardly spaced relation from the second mounting flange 38, leaving the predetermined radial gap therebetween.

The cavity 41 is substantially filled with a loose type of insulation material 46. Such insulation is packed into the internal convolutions 32 of the bellows without jeopardizing the flexing function of such bellows. While any suitable type of insulation material may be used, alumina silica ceramic fiber insulation is preferred. An annular ring of constrained insulation material 48 is disposed within the end of the cavity 41. The ring is sized for close fitting receipt between the second flange 38 and the second end portion 43 of the shield 40, thereby bridging the gap therebetween so as to close the opposite end of cavity 41. Thus, the loose insulation 46 is completely contained and therefore not subject to loss or erosion by the flow of air along path 17. The annular ring 48 may also be of alumina silica fiber insulation material, but instead of being loose, is preferably in blanket form. The blanket has a fine wire mesh 50 wrapped thereabout for further constrainment of the insulation material.

The above described bellows assembly 10 is mounted in place between the outlet end 18 of pipe 15 and the inlet end 23 of pipe 16 by connecting the mounting flanges 21 and 29 of the pipes to the appropriate flanges 27 and 38, respectively of the bellows assembly by suitable fastening means, such as by bolts and nuts 52 and 53, respectively. A pair of gaskets 55 and 56 are preferably mounted between the respective flanges for insuring an air tight seal there-between.

As is readily apparent from the drawing, the trailing edge 58 of the second end portion 43 of the shield 40 is preferably disposed inside of the adjacent edge 59 of the shield 27 to keep any direct air flow off th internal insulation 24 of the second pipe. A slight gap is preferably provided between the edges to accomodate any relative movement therebetween due to thermal effects thereon.

OPERATION

While the operation of the present invention is believed clearly apparent from the foregoing description, further amplification will subsequently be made in the following brief summary of such operation.

In operation, it will be appreciated that the fluid pressure system 11 is employed for conducting fluid, such as intake air from recuperator to a combustor of a gas turbine engine, both of which are not shown. Such intake air, due to the preheating it receives in the recuperator, is at a relatively high temperature, typically about 1200° F. As a result, it will be appreciated that the first pipe 15, along with its flange 21, shields 27 and 40, and the first flange 37 of the bellows assembly will be at a like temperature due to their being in direct contact with the heated intake air. Conversely, the second pipe 16 and its flange 29 will be substantially cooler, typically about 400° F., due to their being insulated from the hot air by internal insulation 24.

In order to prevent any thermal loading at the joint between the bellows assembly 10 and the second pipe 16, the flanges 29 and 38 must be at the same temperature.

This is accomplished by the particular construction of the present internally insulated bellows assembly 10 whose bellows 30 not only provides sufficient flexibility to accomodate the relative thermal movements of the pipes 15 and 16, but also provides a sufficient thermal gradient between its flanges 37 and 38 so that a minimal amount of heat is transferred therebetween. As is readily apparent from the foregoing description, this is accomplished by internally insulating the bellows 30 from the hot air by way of loose insulation 46 and the constrained ring of insulation 48. Therefore, because of the thinness of the bellows and the relatively large surface area provided by its convolutions, any heat picked up in its one end portion 34 due its connection to flange 37, is almost entirely dissipated through radiation into the surrounding ambient air before reaching its opposite end portion 35. Thus, there is minimal heat transfer through the bellows assembly, thereby alleviating thermal loading at the connections.

While the invention has been described and shown with particular reference to the preferred embodiment, it will be apparent that variations might be possible that would fall within the scope of the present invention, which is not intended to be limited except as defined in the following claims.

What is claimed is:

1. An internally insulated bellows assembly for providing a flexible transistion in a high temperature fluid pressure system, comprising:
   an annular bellows having first and second end portions;
   cylindrical shield means concentrically spaced entirely within the bellows for forming an annular cavity therebetween, the shield having first and second ends adjacent the first and second ends of the bellows;
   a first mounting portion connected to adjacent first ends of the bellows and shield and defining a closed first end of the cavity;
   a second mounting portion connected to a second end of the bellows:
   an insulating ring member engaging and interconnecting adjacent second ends of the bellows and shield and defining a closed second end of the cavity; and
   insulating material disposed within the cavity.

2. The bellows assembly of claim 1 wherein said fluid pressure system includes first and second pipes with said first pipe having an outlet end and said second pipe having an inlet end in axially spaced registry with said outlet end.

3. The bellows assembly of claim 2 wherein the first and second mounting portions comprise flange means for detachably mounting said bellows assembly to a respective one of said outlet and inlet ends of said first and second pipes.

4. The bellows assembly of claim 3 wherein said insulating ring member comprises a type of blanket insulation wrapped in a wire mesh.

* * * * *